US008260822B1

(12) United States Patent
Braden (10) Patent No.: US 8,260,822 B1
(45) Date of Patent: Sep. 4, 2012

(54) SYSTEMS AND METHODS FOR STORING AND QUERYING SLOWLY CHANGING DIMENSIONS

(75) Inventor: Chris Michael Braden, Hondo, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 419 days.

(21) Appl. No.: 12/190,027

(22) Filed: Aug. 12, 2008

(51) Int. Cl.
*G06F 17/30* (2006.01)
(52) U.S. Cl. ...................................................... 707/802
(58) Field of Classification Search .......... 707/687–689, 707/695, 700, 701, 736, 751, 790–793, 796, 707/800, 802, 803, 807
See application file for complete search history.

(56) References Cited

U.S. PATENT DOCUMENTS

| 6,523,040 | B1 * | 2/2003 | Lo et al. ................................ 1/1 |
| 7,689,431 | B1 * | 3/2010 | Carmel et al. ................. 705/1.1 |
| 2002/0038306 | A1 | 3/2002 | Griffin et al. |
| 2002/0054101 | A1 * | 5/2002 | Beatty ........................... 345/764 |
| 2002/0133368 | A1 | 9/2002 | Strutt et al. |
| 2004/0191745 | A1 * | 9/2004 | Takano et al. ................. 434/322 |
| 2006/0242160 | A1 | 10/2006 | Kanchwalla et al. |
| 2007/0156767 | A1 * | 7/2007 | Hoang et al. ................... 707/200 |
| 2007/0203892 | A1 | 8/2007 | Adams et al. |
| 2008/0083023 | A1 * | 4/2008 | Kumar ............................... 726/6 |

OTHER PUBLICATIONS

Mehler, Gary. "Next Generation Data Warehousing with SAS 9", SUGI 29, Data Warehousing, Management and Quality. SAS Institute, Inc. Paper 114-29. Cary, NC.

* cited by examiner

*Primary Examiner* — Cam-Linh Nguyen
(74) *Attorney, Agent, or Firm* — Brooks, Cameron & Huebsch, PLLC (57) ABSTRACT

A system and method for processing both Type 1 and Type 2 effective dated slowly changing dimension (SCD) date attributes. Two sets of date fields may be provided, an effective from/effective to set for dimensions with effective date logic; and an effective start date/effective end date for all dimensions. A current indicator is used to indicate a currently valid dimension. By processing and setting the date fields, both Type 1 and Type 2 dimensions can be processed and queried similarly. This enables generating an accurate and consistent report of information representing information in a data warehouse as it is now, or as it was at any point in time. The methods also enable for reporting and analysis of historical and trends, as well as future forecasting.

18 Claims, 5 Drawing Sheets

| | 200 | 202 | 204 | 206 | 208 | 210 | 212 | 214 | 216 |
|---|---|---|---|---|---|---|---|---|---|
| | JOBCODE_ID | EFFDT | JOBCODE_LD | MNGR_LVL_SD | EFFDT_FROM | EFFDT_TO | EFF_START_DT | EFF_END_DT | CURRENT_IND |
| 218 | 089001 | 11/14/2004 | Exec Asstnt Chrmn/CEO | Manager | 11/14/2004 | 4/14/2007 | 1/1/1753 | 12/31/9999 | N |
| 220 | 089001 | 4/15/2007 | Exec Asstnt Chrmn/CEO | Manager | 4/15/2007 | 4/15/2007 | 1/1/1753 | 1/7/2008 | N |
| 220 | 089001 | 4/15/2007 | Exec Asstnt Chrmn/CEO | AVP | 4/15/2007 | 4/15/2007 | 1/8/2008 | 1/8/2008 | N |
| 222 | 089001 | 4/15/2007 | Exec Asstnt Chrmn/CEO | Manager | 4/15/2007 | 4/15/2007 | 1/9/2008 | 4/27/2008 | N |
| 224 | 089001 | 4/16/2007 | Exec Asstnt Chrmn/CEO | AVP | 4/16/2007 | 12/31/9999 | 4/28/2008 | 12/31/9999 | N |

SYSTEMS AND METHODS FOR STORING AND QUERYING SLOWLY CHANGING DIMENSIONS

CROSS REFERENCES

The subject matter described in this application is related to subject matter disclosed in the following commonly assigned applications: U.S. patent application Ser. No. 12/190,003, filed on even date, entitled "SYSTEMS AND METHODS FOR STORING AND QUERYING SLOWLY CHANGING DIMENSIONS;" and U.S. patent application Ser. No. 12/190,042, filed on even date, entitled "SYSTEMS AND METHODS FOR STORING AND QUERYING SLOWLY CHANGING DIMENSIONS."

BACKGROUND

In data management and data warehousing, a dimension refers to logical groupings of data such as personnel data, geographical location, customer information, or product information. Slowly Changing Dimensions (SCD) are dimensions that have data that change over time. Conventionally, there are three methods to handle slowly changing dimensions, designated as Type 1, Type 2 and Type 3. Which technique to use depends on business requirements, as each technique behaves differently.

Using Type 1 SDC's, the old data is overwritten with new data. The dimension attribute reflects the latest state, but any historical values are lost. This technique is often utilized for processing corrections, or when the old value has no business significance. While the type 1 technique appears simple to implement, unexpected complications may arise with type 1 attribute changes. For example, if fact data have been previously aggregated based on the type 1 attribute, when the dimension value is overwritten, then any ad hoc summarization based on the new value will no longer tie to the pre aggregated data.

With a Type 2 change, a new row with a new surrogate primary key is inserted into the dimension table to reflect the new attribute values. Both the prior and new rows include the natural key (or durable identifier) as an attribute, along with a row effective date, row expiration date, and current row indicator. The type 2 technique is used when a meaningful change to the dimension has taken place and it is appropriate to partition history by the changed attribute. Each surrogate key corresponds to a unique version of the dimension row that was true for a span of time. Thus, each surrogate key is used in the corresponding fact rows during the time when the particular instance was valid.

The Type 3 technique is usually utilized when the change, like the redrawing of sales district boundaries or redefinition of product category boundaries, is a "soft" change. In other words, although the change has occurred, it is still logically possible to act as if the change had not occurred. For example, a business entity may want to track sales performance with either the old or the new sales district definitions. In this case, history cannot be partitioned as in a Type 2 methodology, but rather, the Type 3 methodology simultaneously provides both the old attribute value and new value in the same dimension row. This allows users to choose between the two versions. With a type 3 response, a new column is added to the dimension table. The old attribute value is pushed into a "prior" attribute column and the new attribute value is overwritten in the existing column.

However, as noted above, the behaviors of each Type are different. As such, the methodology for processing and consuming information contained in warehouses where both types are used together can be complex, especially when the dimensional source data itself is equally complex.

SUMMARY

Type 1 and Type 2 slowly changing dimensional (SCD) date sub records that are based on effective dated source data may be processed and maintained in dimensional tables in a data warehouse system. Two sets of date fields may be provided, an effective from/effective to set for dimensions with effective date logic; and an effective start date/effective end date for all dimensions. A current indicator is used to indicate a currently valid dimension. By processing and setting both sets of date fields, both Type 1 and Type 2 dimensions may be stored in dimension tables with similar data structures. This enables generating an accurate and consistent report of information representing information in a data warehouse as it is now, or as it was at any point in time based on the both the source effective dating, as well as the date the rows were created in the warehouse. The methods also enable for reporting and analysis of historical and trends, as well as future forecasting.

In some implementations, a method for representing data in a data warehouse for historical and current reporting may be provided that includes receiving effective dated dimensions in sequential rows, and setting date attributes associated with the effective dated dimensions for each row, the date attributes including an effective to date, an effective from date, an effective start date, and an effective end date. The method may further include setting an effective start date of a first row to a date prior to any of the date attributes, and setting an effective end date of a last row to a date after any of the date attributes.

In some implementations, a system for representing data in a data warehouse for historical and current reporting may be provided. The system may include at least one subsystem for receiving effective dated dimensions in sequential rows, and at least one subsystem for setting date attributes associated with the effective dated dimensions for each row, the date attributes including an effective to date, an effective from date, an effective start date, and an effective end date. A subsystem for setting an effective start date of a first row to a date prior to any of the date attributes may be provided as well as a subsystem for setting an effective end date of a last row to a date after any of the date attributes.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
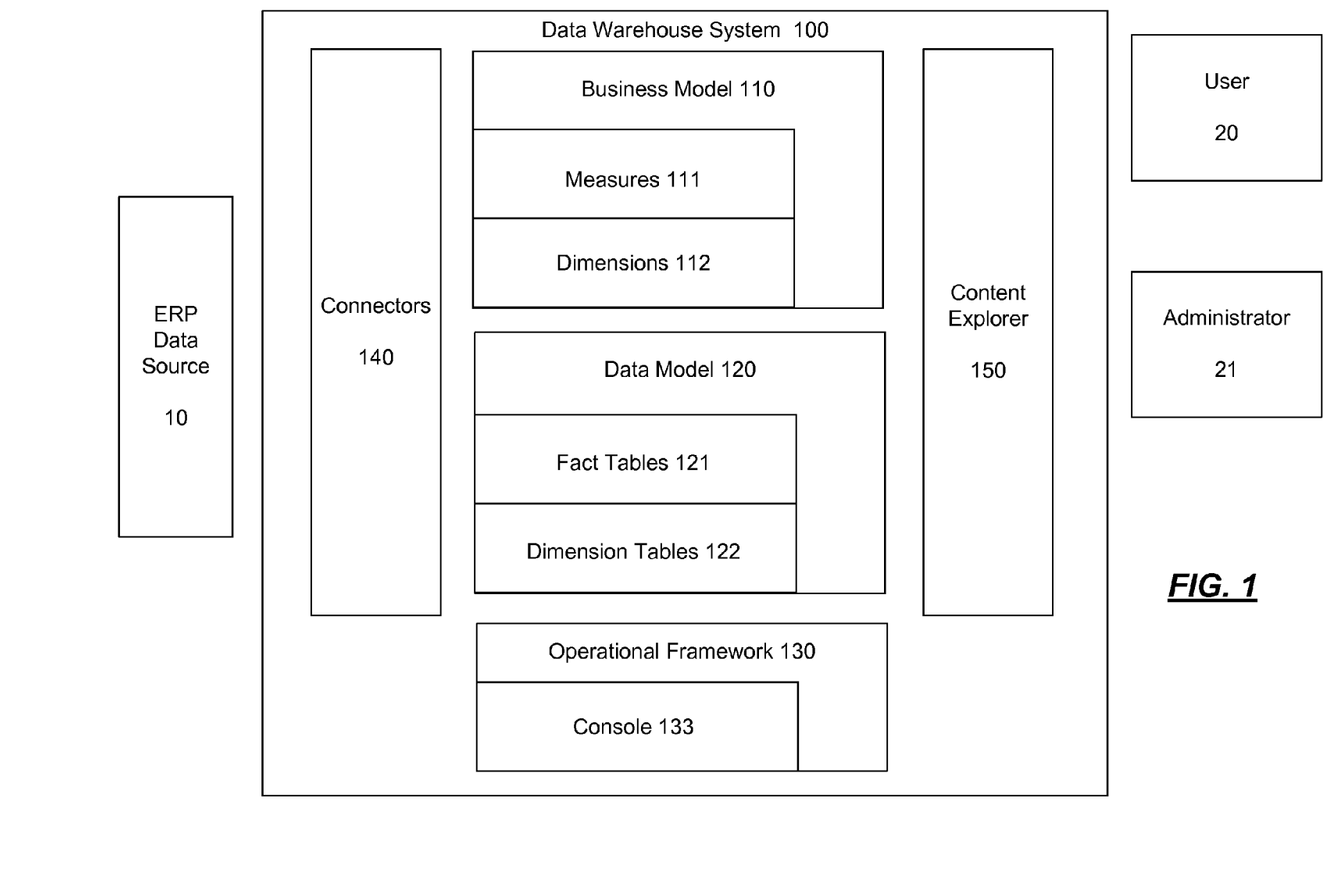
FIG. 1 illustrates a exemplary configurable data warehouse.

Referring to FIG. 1, there is illustrated an exemplary configurable data warehouse. FIG. 1 shows a data warehouse environment including an enterprise resource planner (ERP) data source 10, a user 20, an administrator 21 and a configurable data warehouse system 100. The user 20 is a person and/or system that accesses the data warehouse system 100. The administrator 21 refers is the person and/or system that administers the data warehouse system 100. These roles may be performed by the same person and/or system.

The configurable data warehouse system 100 may include a business model 110, a data model 120, an operational framework 130, connectors 140 and a content explorer 150. The business model 110 may include measures 111 and dimensions 112. The data model 120 may include fact tables 121 and dimension tables 122. The operational framework 130 may include a console 133.

The configurable data warehouse system 100 may be understood to be a system for measuring the performance of an organization. The data warehouse system 100 may be applicable to various organizations and is not limited to only one organization. The data warehouse system 100 may be configured to a specific organization.

The business model 110 includes a set of analytics and paths used to measure the performance of an organization. The business model 110 may contain measures 111, which map the business questions to which users 20 of a data warehouse may want answers. The measures 111 may represent measurements of business activity aspects of an organization. For example, a business activity may be a sales order. A measure 111 for a sales order may be sales order volume. Another example of a measure 111 is inventory amounts. In this example, inventory is the business activity measured.

Numerous business questions for numerous businesses are categorized into different areas of analysis. The set of measures 111 in the business model 110 represents a union of measures used to perform analysis for different organizations. This union of measures may comprise the minimum set of measures 111 needed to perform the desired analysis for all of the different organizations to which the business model 110 applies. The business model 110 may also include a set of dimensions 112 that represent the structure of an organization from an informational or dimensional viewpoint. In other words, the dimensions represent the business reference aspects of an organization. An example of a dimension is the class of customers of an organization. Further examples of dimensions and measures are provided below.

The business model 110 may be implemented in the data model 120. The data model 120 is organized to facilitate the analysis performed at the business model 110 level. The data model 120 may contain fact tables that contain the measures used to measure the performance of an organization. The data model 120 may also include a set of dimension tables 122 that represent the structure of an organization from a dimensional viewpoint. Another example of a dimension is the class of employees of an organization.

Data may be collected from the organization ERP 10 and passed into the data model 120 through the connectors 140. For example, connectors 140 may be created through an extraction, transformation and loading (ETL) tool. The data warehouse system 100 may be operated by an administrator 21 through the console 133 of the operational framework 130. The operational framework 130 may also be used to configure the data warehouse system 100. Finally, the content explorer 150 contains a set of reports used by the user 20 to review the analysis performed by the data warehouse system 100.

Figure 2:
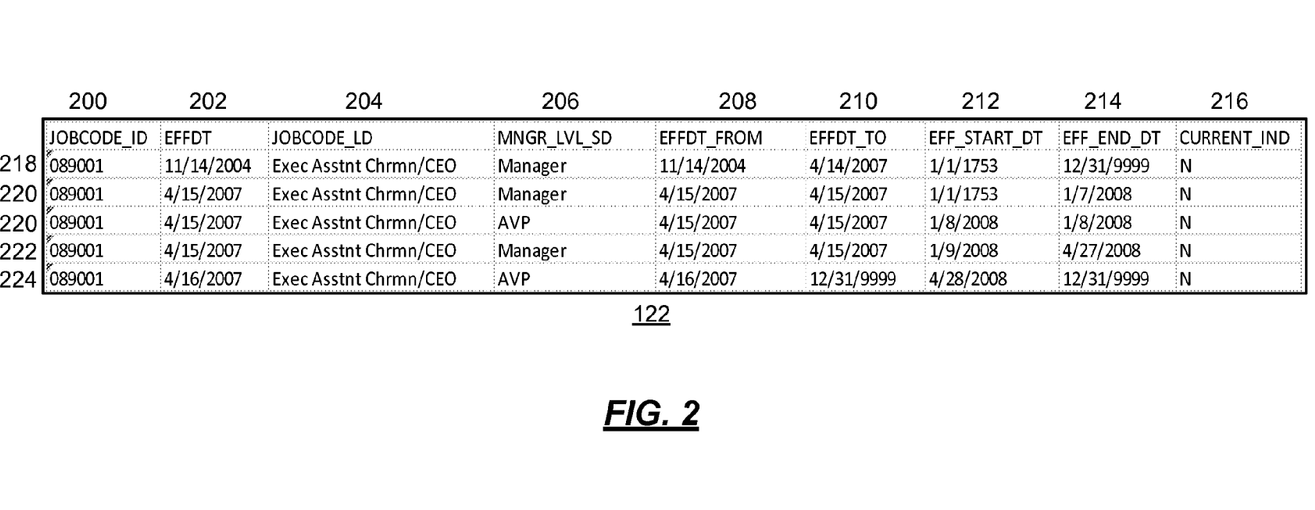
FIG. 2 depicts an example dimension table.

With reference to FIG. 2, in some implementations, dimension tables 122 may contain attributes that describe records regarding data that measures the organization's business operations. Some of the attributes may provide descriptive information, whereas others may be used to specify how data should be summarized to provide useful information to the user 20. Dimension tables 122 may contain hierarchies of attributes that aid in summarization. For example, a dimension containing personnel information may contain a hierarchy that separates individuals into categories such as job titles, reporting roles and pay grades, with each of these categories further subdivided a number of times until, e.g., each person in an organization's structure is reached at a lowest level.

Dimensional modeling may produce dimension tables 122 in which each table contains fact attributes that are independent of those in other dimensions. For example, a customer dimension table contains data about customers, a services dimension table contains information about services, and a personnel dimension table contains information about people. Queries use attributes in dimensions to specify a view into the fact information. For example, a query might use the personnel store and time dimensions to ask the question "What was Jane Doe's title in 1999?" Subsequent queries might drill down along one or more dimensions to examine more detailed data, such as "Who reported to Jane Doe when she was Manager of Operations?"

FIG. 2 is an exemplary dimension table 122 containing slowly changing data that may be used for both SCD Type 1 (update existing records with new attributes) and SCD Type 2 (add new rows when attributes change) dimensions. Dimensional table 122 enables the data warehouse system 100 to correctly process Type 1 and Type 2 effective dated SCD dimensional date attributes. For example, type 2 dimensions may be used to provide historical information about Jane Doe's previous employment titles. However, if the user 20 was interested in the results of the query "Who would have reported to Jane Doe if she was Director of Engineering in 1999," then this information would not be available in the data warehouse system 100 using conventional tables. Dimension table 122 provides an implementation whereby the user 20 may query detailed historical information and generate "what-if" scenarios, such as that above to accurately retrieve information regarding such queries to determine how an organization would have looked under the queried parameters.

In the exemplary dimension table 122 of FIG. 2, columns 200-216 may be configured to store human resources information for a specific organization. In particular, column 200 contains a job code, column 202 contains an effective date (EFFDT), column 204 is a job code description, column 206 is job code manager level description, column 208 is a "effective from date" field, column 210 is an "effective to date" field, column 212 is an "effective date start" field, column 214 is an "effective date end" field, and column 216 is a current record indicator.

In some implementations, the EFFDT field (column 202) may be used in by applications to enable the viewing of data that changes over time. The EFF_START_DT (column 212) and EFF_END_DT (column 214) represent an effective start date and effective end date of the dated dimension based on the date the row (e.g., rows 218-224) was received into the warehouse. The EFFDT_FROM (column 208) and EFFDT_TO (column 210) represent an "effective from date" and "effective to date" date range that defines a period of transactional history based on the business transaction date, i.e., when the record is effective in the source system 100.

In some implementations, through the use of two sets of date ranges (EFF_START_DT/EFF_END_DT and EFFDT_FROM/EFFDT_TO), data contained in the dimension EFFDT_TO), 122 enables an organization to view current personnel information, as well as historical personnel information at any point in tracked history with great accuracy. In addition, the dimension table 122 provides a mechanism to implement "what-if" scenarios by altering the EFFDT_FROM, EFFDT_TO date ranges. It is noted that the dimension table 122 may contain information other than personnel information, any may include any type of information that an organization may track in the data warehouse system 100. Personnel information is being used herein for exemplary purposes only and should not limit the teaching of the present disclosure.

Figure 3:
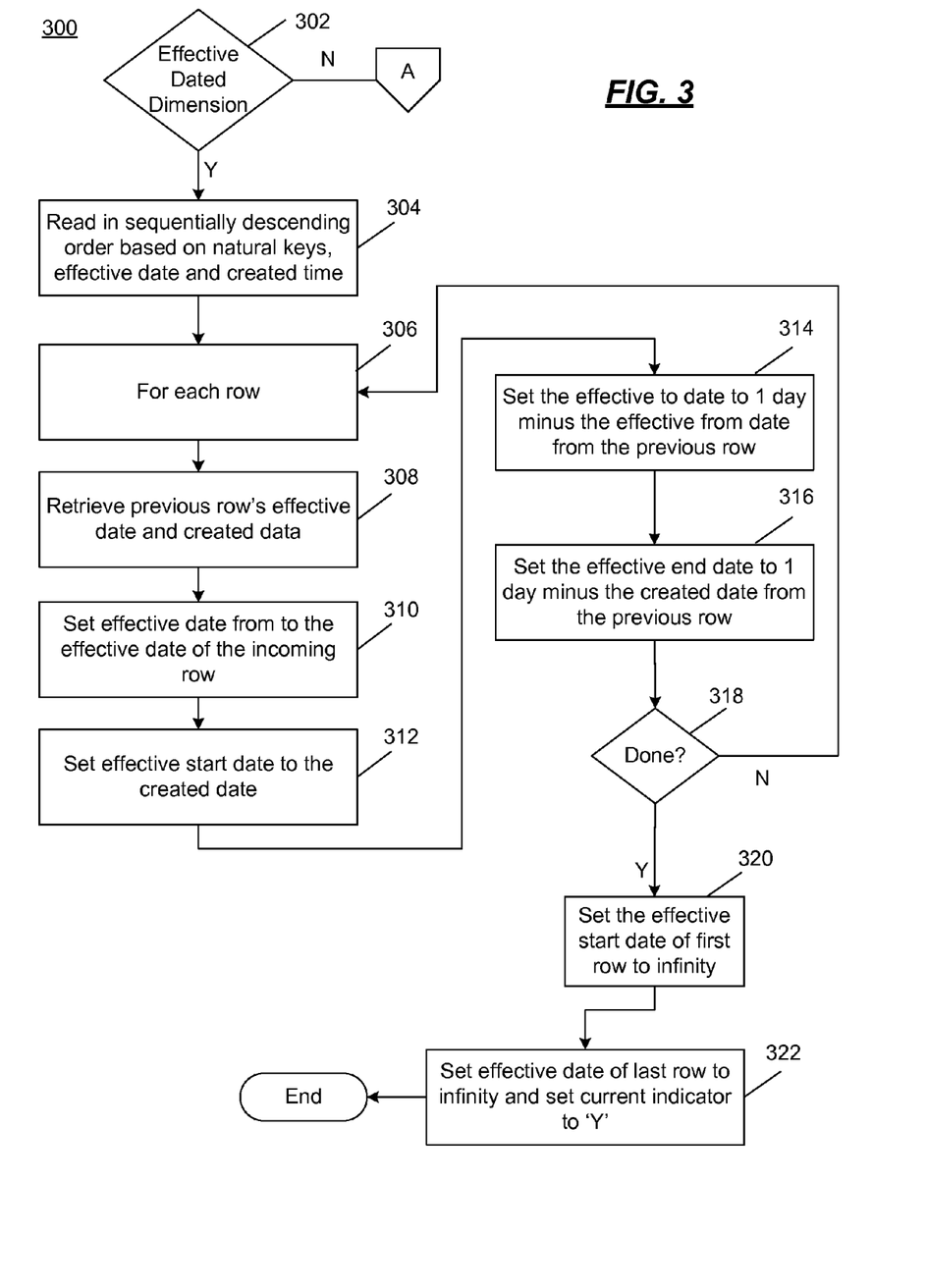
FIG. 3 illustrates an operational flowchart illustrating implementations of the present disclosure to create the dimension table.

FIG. 3 illustrates an operational flowchart 300 illustrating implementations of the present disclosure to create the dimension table 122. At 302, it is determined if effective dated dimension data is received. For example, the business model 110 or data model 120 through the connectors 140 may determine if the ERP data source is communicating data having an EFFDT field. If it is determined at 302 that effective dated dimension data was received, then at 304, the data is read in sequentially descending order based on natural keys, an effective date and a created time. Next, for each row that is read in a loop begins at 306 until the last row is processed. At 308, a previous row's effective date and created data are retrieved. At 310, an "effective from date" of the current row is set to the effective date of current row. For example, the EFFDT_FROM for each row 218-224 may be set to the EFFDT of that row. At 312, the effective start date is set to the created date for the current row. For example, EFF_START_DT may be set to the created date for a particular row.

At 314, the "effective to" date of the current row is set to one day minus the "effective from" date from the previous row. For example, the EFFDT_TO date for row 222 (4/15/2007) may be set to one day prior to row 224 (4/16/2007). At 316, the effective end date is set to one day minus the created date from the previous row. For example, the EFF_END_DT for row 222 is set to one day prior to the EFF_START_DT (i.e., the created date) of row 224.

At 318, it is determined if processing of the dimension data is complete. If not, then the loop returns to 306 to process the next sequential record. If yes, then at 320 for the first row in the dimension table after processing, the effective start date is set to minus infinity. For example, in row 218, the EFF_START_DT field in column 212 is set to 1/1/1753 (i.e., minus infinity for purposes of the data warehouse system 100). It is noted that any date in the past may be interpreted to be minus infinity. Next, at 322, for the last row in the dimension table, the effective end is set to infinity and the current indicator is set to 'Y'. For example for row 224, the EFF_END_DT is set to 12/31/9999 to indicate positive infinity to the data warehouse system 100. Any other suitable date may be used. The current indicator (column 216) is used to identify the record containing the current data.

Figure 4:
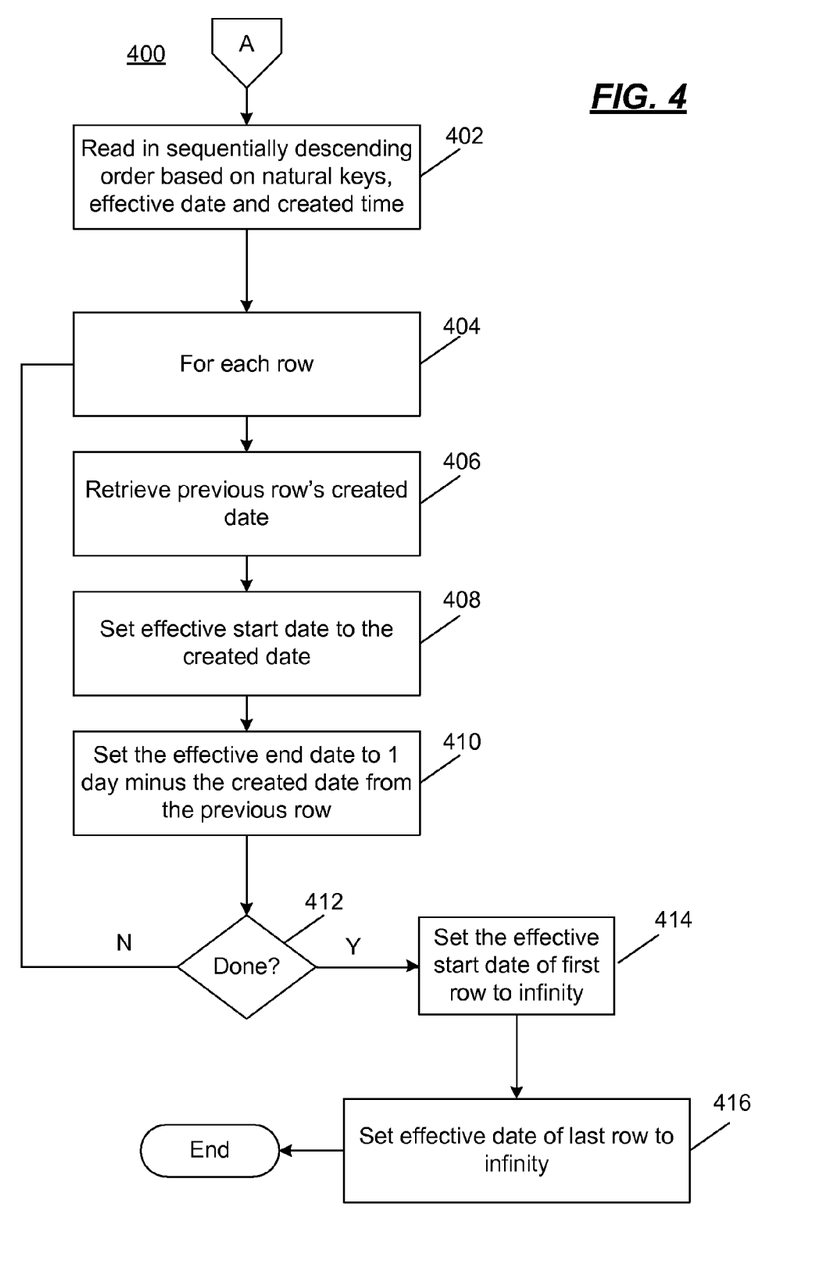
FIG. 4 illustrates an operation flowchart to create the dimension table for non-effective dated dimensions.

Referring to FIG. 4, there is an operational flowchart 400 illustrating implementations of the present disclosure to create the dimension table 122 where non-effective dated dimensions are received. For example, the operational flowchart 400 may be implemented as a result of a "no" decision at 302 in FIG. 3.

At 402, the data is read in sequentially descending order based on natural keys, an effective date and a created time. For example, the business model 110 or data model 120 through the connectors 140 may have determined at 302 that the ERP data source is communicating data without an EFFDT field. Next, for each row that is read in a loop begins at 404 until the last row is processed. At 406, a previous row's effective date and created data are retrieved. At 408, the effective start date is set to the created date for the current row. For example, EFF_START_DT may be set to the created date for a particular row.

At 410, the effective end date is set to one day minus the created date from the previous row. For example, the EFF_END_DT for the current row is set to one day prior to the EFF_START_DT of the previous row. At 412, it is determined if processing of the dimension data is complete. If not, then the loop returns to 404 to process the next sequential record. If yes, then at 414 for the first row, the effective start date is set to minus infinity. For example, the EFF_START_DT field may be set to 1/1/1753 (i.e., minus infinity for purposes of the data warehouse system 100). It is noted that any date in the past may be interpreted to be minus infinity. Next, at 416, for the last row, the effective end is set to infinity. For example, the EFF_END_DT may be set to 12/31/9999 to indicate positive infinity to the data warehouse system 100. Any other suitable date may be used.

By populating the dimension tables as described with reference to FIGS. 2-4, information may be reported as it is now, or as it was at any point in time. In addition, reporting and analytics related to both historical and trend analysis, as well as future forecasting may be performed. For example, if column 202 is a primary key, then the use of the date attributes described with reference to FIG. 2 may provide reporting of the JOBCODE_ID at any point in time to accurately reflect changes such as that which occurred on Jan. 8, 2008 when the manager level changed from manager to AVP and the change back on Jan. 9, 2008 to manager. In addition, the data may be queried to indicate that the JOBCODE_ID currently represents a manager level of AVP. In addition, "what-if" scenarios can be created by modifying the date attributes to determine who an organization would have looked and to determine what, if any, affects a change may have had on the organization. Thus, as is now evident from the disclosure and the implementations described herein, maintain Type 1 and Type 2 dimensions in dimension tables in a data warehouse provides unique reporting, querying and analysis flexibilities.

Figure 5:
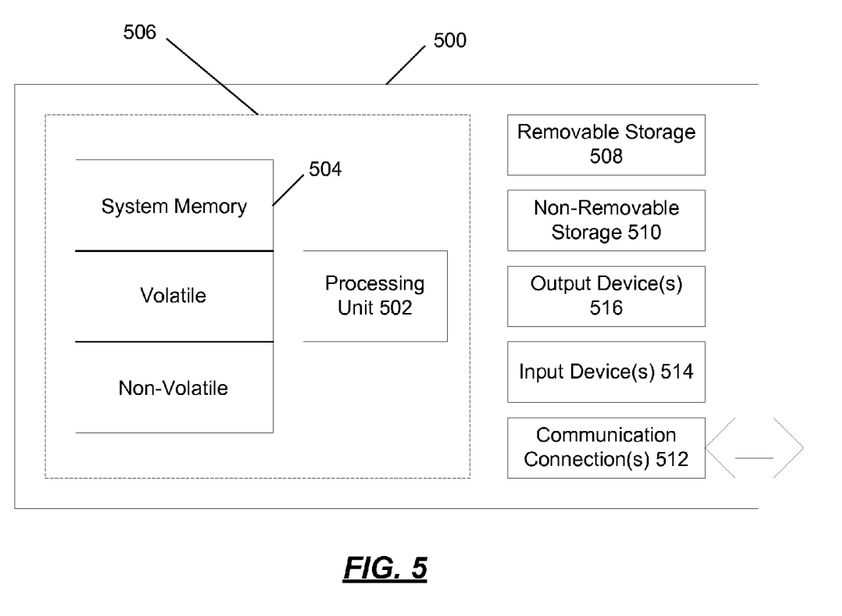
FIG. 5 depicts an example operational environment that may be used to practice aspects of the present disclosure.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer readable medium storing instructions for representing data in a data warehouse for historical and current reporting, executable by the computer to cause the computer to:
   receive effective dated dimensions in sequential rows;
   set date attributes associated with the effective dated dimensions for each row, the date attributes including an effective to date, an effective from date, an effective start date, and an effective end date;

set the effective start date of a first row to a date prior to any of the date attributes;

set the effective end date of a last row to a date after any of the date attributes;

set the effective to date of a row between the first row and the last row to one day minus the effective from date of a previous row;

sort the sequential rows based on a primary key and a created date;

key the rows based on the primary key; and read the rows of the effective dated dimensions sequentially based on an effective date, a natural key, and the created date.

2. The method of claim 1, further comprising setting a current indicator of the last row to indicate that the last row contains current dimensional data.

3. The method of claim 1, further comprising:

maintaining Type 2 slowly changing data with reference to the primary key within the dimension table; and maintaining Type 1 slowly changing data with reference to the primary key within the dimension table.

4. The method of claim 3, further comprising linking a plurality of dimension tables by the primary key.

5. The method of claim 1, further comprising setting the effective start date and the effective end date to an infinite value.

6. The method of claim 1, further comprising maintaining information to report changes to historical data at any point in time up to a current time.

7. A non-transitory computer-readable medium comprising computer-readable instructions for representing data in a data warehouse for historical and current reporting, the instructions when executed performing a method comprising:

receiving effective dated dimensions in sequential rows;

setting date attributes associated with the effective dated dimensions for each row, the date attributes including an effective to date, an effective from date, an effective start date, and an effective end date;

setting the effective start date of a first row to a date prior to any of the date attributes;

setting the effective end date of a last row to a date after any of the date attributes;

setting the effective to date of a row between the first row and the last row to one day minus the effective from date of a previous row;

sorting the sequential rows based on a primary key and a created date;

keying the rows based on the primary key; and reading the rows of the effective dated dimensions sequentially based on an effective date, a natural key, and the created date.

8. The computer-readable medium of claim 7, further comprising instructions for setting a current indicator of the last row to indicate that the last row contains current dimensional data.

9. The computer-readable medium of claim 8, further comprising instructions for:

maintaining Type 2 slowly changing data with reference to the primary key within the dimension table; and maintaining Type 1 slowly changing data with reference to the primary key within the dimension table.

10. The computer-readable medium of claim 9, further comprising instructions for linking a plurality of dimension tables by the primary key.

11. The computer-readable medium of claim 7, further comprising instructions for setting the effective start date and the effective end date to an infinite value.

12. The computer-readable medium of claim 7, further comprising instructions for maintaining information to report changes to historical data at any point in time up to a current time.

13. A system that includes memory and an at least one processor for representing data in a data warehouse for historical and current reporting, comprising:

at least one subsystem for receiving effective dated dimensions in sequential rows;

at least one subsystem for setting date attributes associated with the effective dated dimensions for each row, the date attributes including an effective to date, an effective from date, an effective start date, and an effective end date;

at least one subsystem for setting the effective start date of a first row to a date prior to any of the date attributes;

at least one subsystem for setting the effective end date of a last row to a date after any of the date attributes;

at least one subsystem for setting the effective to date of a row between the first row and the last row to one day minus the effective from date of a previous row;

at least one subsystem for sorting the sequential rows based on a primary key and a created date;

at least one subsystem for keying the rows based on the primary key; and at least one subsystem for reading the rows of the effective dated dimensions sequentially based on an effective date, a natural key, and the created date.

14. The system of claim 13, wherein a current indicator of the last row is set to indicate that the last row contains current dimensional data.

15. The system of claim 13, wherein Type 2 slowly changing data is maintained with reference to the primary key within the dimension table, and wherein Type 1 slowly changing data is maintained with reference to the primary key within the dimension table.

16. The system of claim 15, wherein a plurality of dimension tables are linked by the primary key.

17. The system of claim 13, wherein the effective start date and the effective end date are set to an infinite value.

18. The system of claim 13, wherein information to report changes to historical data is maintained for any point in time up to a current time.

* * * * *